US011940689B2

(12) United States Patent
Schmidt et al.

(10) Patent No.: US 11,940,689 B2
(45) Date of Patent: Mar. 26, 2024

(54) HIGH TRANSMISSION LIGHT CONTROL FILM

(71) Applicant: 3M INNOVATIVE PROPERTIES COMPANY, St. Paul, MN (US)

(72) Inventors: Daniel J. Schmidt, Woodbury, MN (US); Kevin W. Gotrik, Hudson, WI (US); Nicholas A. Johnson, Burnsville, MN (US); Raymond J. Kenney, Woodbury, MN (US); Caleb T. Nelson, McKinney, TX (US); Kenneth A. Epstein, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/064,644

(22) Filed: Dec. 12, 2022

(65) Prior Publication Data

US 2023/0109003 A1    Apr. 6, 2023

Related U.S. Application Data

(63) Continuation of application No. 17/264,512, filed as application No. PCT/IB2019/056489 on Jul. 30, 2019, now Pat. No. 11,550,183.

(Continued)

(51) Int. Cl.
*G02F 1/1335*    (2006.01)
*G02B 5/00*    (2006.01)
*G02B 5/30*    (2006.01)

(52) U.S. Cl.
CPC ....... *G02F 1/133524* (2013.01); *G02B 5/003* (2013.01); *G02B 5/305* (2013.01); *G02B 2207/123* (2013.01)

(58) Field of Classification Search
CPC ......... G02F 1/133524; G02F 1/133536; G02F 1/133562; G02B 5/305; G02B 5/003;
(Continued)

(56) References Cited

U.S. PATENT DOCUMENTS 3,524,789 A    8/1970 Olsen
4,601,861 A    7/1986 Pricone et al.
(Continued)

FOREIGN PATENT DOCUMENTS

JP    5092751 A    7/1975
JP    2010237344 A    10/2010
(Continued)

OTHER PUBLICATIONS

International Search Report for PCT Application No. PCT/IB2019/056489, dated Dec. 24, 2019, 6 pages.
(Continued)

*Primary Examiner* — Hoan C Nguyen
(74) *Attorney, Agent, or Firm* — Jonathan L. Tolstedt

(57) ABSTRACT

A light control film comprises a light input surface and a light output surface opposite the light input surface; alternating transmissive regions and absorptive regions disposed between the light input surface and the light output surface, wherein the absorptive regions comprise a core having a first concentration, $C_1$, of a light absorbing material sandwiched between cladding layers having a second concentration, $C_2$, of the light absorbing material, wherein $C_2 < C_1$, and wherein the cores have an aspect ratio of at least 20.

20 Claims, 5 Drawing Sheets

Related U.S. Application Data

(60) Provisional application No. 62/713,462, filed on Aug. 1, 2018.

(58) Field of Classification Search
 CPC .. G02B 2207/123; G02B 5/208; G02B 5/122;
  G02B 5/128; G02B 27/30; G02B 3/0056;
  E06B 9/24; E06B 2009/2405; B29D
  11/00788; B29D 11/00634; G06V 40/10;
  G06V 40/1324; G03B 11/00
 See application file for complete search history.

(56) References Cited

U.S. PATENT DOCUMENTS

| | | | |
|---|---|---|---|
| 5,254,388 A * | 10/1993 | Melby | H01J 29/89 428/218 |
| 5,486,949 A | 1/1996 | Schrenk et al. | |
| 5,612,820 A | 3/1997 | Schrenk et al. | |
| 5,783,120 A | 7/1998 | Ouderkirk et al. | |
| 5,825,543 A | 10/1998 | Ouderkirk et al. | |
| 5,828,488 A | 10/1998 | Ouderkirk et al. | |
| 5,830,376 A | 11/1998 | Bohlke et al. | |
| 5,882,774 A | 3/1999 | Jonza et al. | |
| 6,111,696 A | 8/2000 | Allen et al. | |
| 6,398,370 B1 | 6/2002 | Chiu et al. | |
| 6,531,230 B1 | 3/2003 | Weber et al. | |
| 6,773,801 B2 | 8/2004 | Hattori et al. | |
| 7,018,713 B2 | 3/2006 | Padiyath et al. | |
| 7,128,966 B2 | 10/2006 | Hattori | |
| 7,140,741 B2 | 11/2006 | Fleming et al. | |
| 7,173,778 B2 | 2/2007 | Jing et al. | |
| 7,267,850 B2 | 9/2007 | Coggio et al. | |
| 7,467,873 B2 | 12/2008 | Clarke et al. | |
| 7,486,019 B2 | 2/2009 | Padiyath et al. | |
| 7,575,847 B2 | 8/2009 | Jing et al. | |
| 8,012,567 B2 | 9/2011 | Gaides et al. | |
| 8,013,567 B2 | 9/2011 | Windsor | |
| 8,096,667 B2 | 1/2012 | Boyd et al. | |
| 8,213,082 B2 | 7/2012 | Gaides et al. | |
| 8,234,998 B2 | 8/2012 | Krogman et al. | |
| 8,313,798 B2 | 11/2012 | Nogueira et al. | |
| 8,460,568 B2 | 6/2013 | David et al. | |
| 8,503,122 B2 | 8/2013 | Liu et al. | |
| 9,329,311 B2 | 5/2016 | Halverson et al. | |
| 9,335,449 B2 | 5/2016 | Gaides et al. | |
| 9,453,949 B2 | 9/2016 | Nand et al. | |
| 9,500,888 B2 * | 11/2016 | Schwartz | G02F 1/1323 |
| 9,519,080 B2 | 12/2016 | Cok | |
| 2004/0120667 A1 * | 6/2004 | Aylward | G02B 6/08 385/115 |
| 2006/0159901 A1 * | 7/2006 | Tischler | B32B 27/02 428/411.1 |
| 2006/0164577 A1 | 7/2006 | Lim et al. | |
| 2007/0153377 A1 * | 7/2007 | Goto | G02F 1/133524 359/460 |
| 2007/0160811 A1 * | 7/2007 | Gaides | G02B 5/003 428/173 |
| 2007/0218261 A1 * | 9/2007 | Saitoh | B32B 27/08 313/112 |
| 2007/0268586 A1 | 11/2007 | Mimura et al. | |
| 2008/0186558 A1 | 8/2008 | Lee et al. | |
| 2009/0219622 A1 * | 9/2009 | Tischler | H10K 50/858 29/428 |
| 2010/0271721 A1 | 10/2010 | Gaides et al. | |
| 2011/0064936 A1 | 3/2011 | Cunningham et al. | |
| 2011/0217513 A1 | 9/2011 | Hwang | |
| 2014/0160404 A1 * | 6/2014 | Yamada | G02B 5/223 362/19 |
| 2015/0276988 A1 | 10/2015 | Cok | |
| 2015/0279688 A1 * | 10/2015 | Cok | G06F 21/84 359/485.05 |
| 2015/0338558 A1 | 11/2015 | Hwang | |
| 2016/0068703 A1 | 3/2016 | Schmidt et al. | |
| 2020/0057899 A1 * | 2/2020 | Chung | G06V 40/10 |
| 2020/0400865 A1 * | 12/2020 | Schmidt | G02B 5/286 |

FOREIGN PATENT DOCUMENTS

| | | |
|---|---|---|
| JP | 4747653 B2 | 8/2011 |
| WO | 1990013052 A1 | 11/1990 |
| WO | WO-9013052 A1 * | 11/1990 |
| WO | 1992011549 A1 | 7/1992 |
| WO | 2006025956 A1 | 3/2006 |
| WO | 2006025992 A1 | 3/2006 |
| WO | 2006102383 A1 | 9/2006 |
| WO | 2011055657 A1 | 5/2011 |
| WO | 2015095317 A1 | 6/2015 |
| WO | 2019118685 A1 | 6/2019 |

OTHER PUBLICATIONS

Krogman, "Automated Process for Improved Uniformity and Versatility of Layer-by-Layer Deposition", Langmuir, Mar. 13, 2007, vol. 23, No. 6, pp. 3137-3141.

* cited by examiner

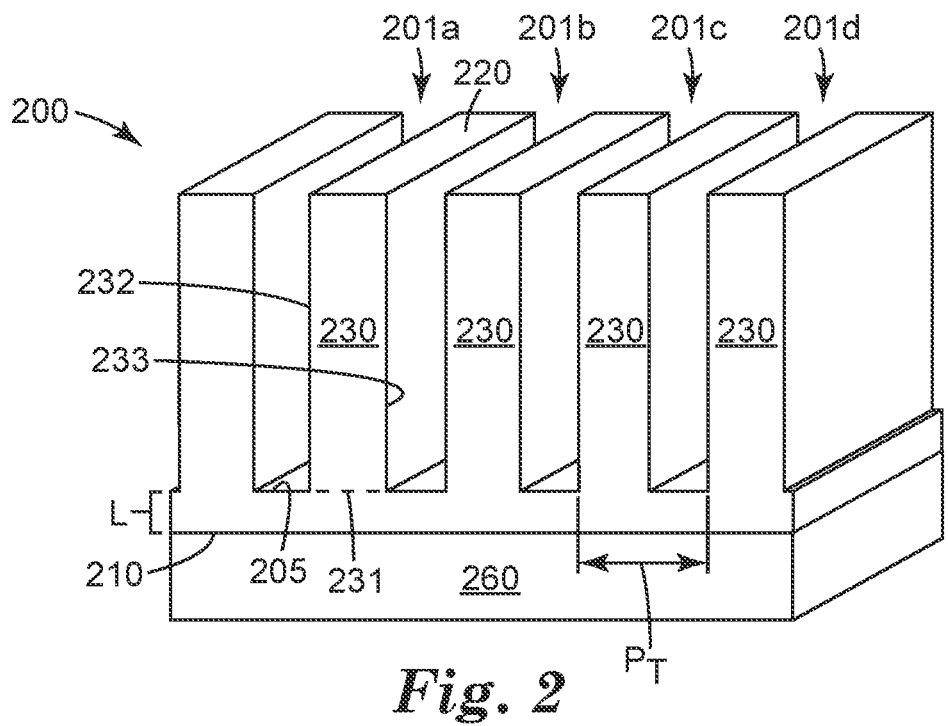
*Fig. 2*
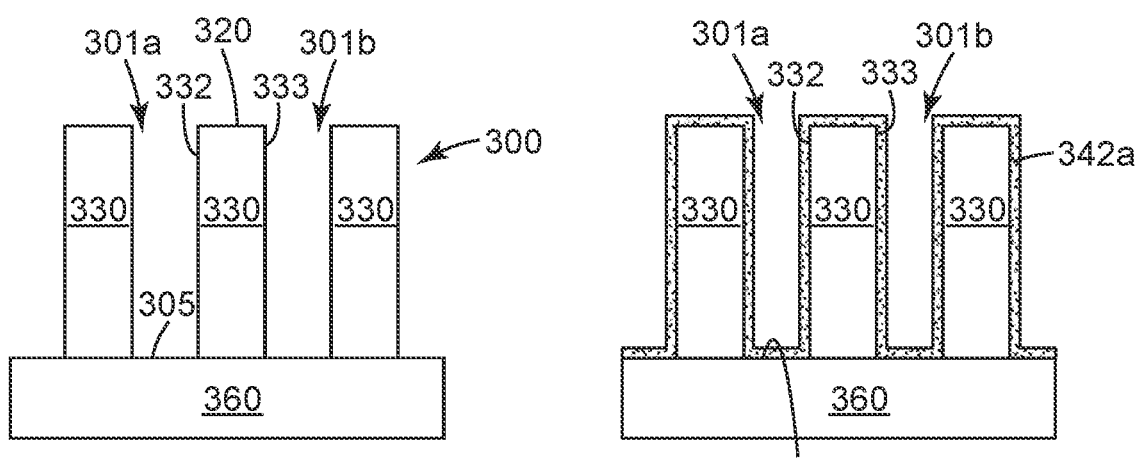
*Fig. 3a*  *Fig. 3b*

HIGH TRANSMISSION LIGHT CONTROL FILM

FIELD

This invention relates to light control films and methods of making the light control films.

BACKGROUND

Louver-based light control films for applications such as privacy filters and automotive display filters have traditionally been made by skiving processes, microreplication or cast-and-cure processes. A limitation of traditional louver-based light control films is that on-axis light transmission is limited because of the louver aspect ratios, which are typically about 10:1 to about 15:1.

BRIEF DESCRIPTION OF THE DRAWINGS

FIG. 1b depicts the polar cut-off viewing angle of the light control film of FIG. 1a.

FIG. 2 is a perspective view of a microstructured film.

FIGS. 3a-3f are a cross-sectional schematic of an embodied method of making a light control film.

SUMMARY

Figure 1A:
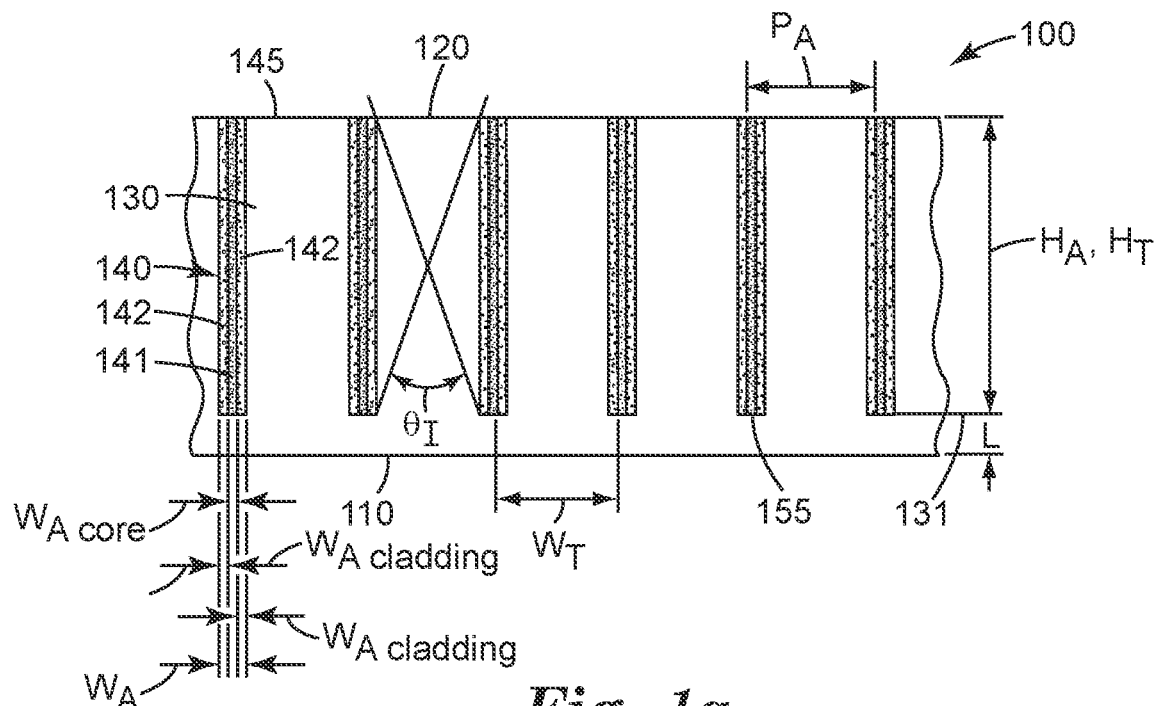
FIG. 1a is a cross-sectional view of an embodied light control film.

In view of the forgoing, we recognize there is a need in the art for light control films with higher aspect ratios that can allow more on-axis light transmission. We also recognize that it is necessary that high aspect ratio louvers have a relatively high extinction coefficient to efficiently absorb light in an ultra-thin coating. The high extinction coefficient can produce a reflective, metal-like interface with the transmissive regions of the light control film. We have discovered that adding cladding layers on each side of a high extinction coefficient core reduces louver reflectivity and thereby reduces high angle light leakage and ghosting.

Briefly, in one aspect we have discovered light control film comprising a light input surface and a light output surface opposite the light input surface and alternating transmissive regions and absorptive regions disposed between the light input surface and the light output surface, wherein the absorptive regions comprise a core having a first concentration, $C_1$, of a light absorbing material sandwiched between cladding layers having a second concentration, $C_2$, of the light absorbing material, wherein $C_2 < C_1$, and wherein the cores have an aspect ratio of at least 20.

In another aspect, we have discovered light control film comprising a light input surface and a light output surface opposite the light input surface and alternating transmissive regions and absorptive regions disposed between the light input surface and the light output surface, wherein the absorptive regions comprise a core having a first extinction coefficient, $k_1$, sandwiched between cladding layers having a second extinction coefficient, $k_2$, wherein $k_2 < k_1$, and wherein the cores have an aspect ratio of at least 20.

In yet another aspect, we have discovered a light control film comprising a light input surface and a light output surface opposite the light input surface and alternating transmissive regions and absorptive regions disposed between the light input surface and the light output surface, wherein the absorptive regions comprise a core comprising light absorbing particles sandwiched between cladding layers comprising light absorbing particles and non-light absorbing diluent, and wherein the cores have an aspect ratio of at least 20.

In still another aspect, we have discovered a method of making a light control film comprising (a) providing a microstructured film comprising a plurality of light transmissive regions alternated with channels, wherein the microstructured film has a surface defined by a top surface and side walls of the light transmissive regions and a bottom surface of the channels; (b) applying one or more layers of a light absorptive cladding material, each layer having a concentration of light absorbing particles, to the surface; (c) applying a layer of a light absorptive core material having a first concentration of light absorbing particles, $C_1$, on the one or more layers of light absorptive cladding material; (d) applying an additional one or more layers of a light absorptive cladding material, each additional layer having a concentration of light absorbing particles, on the layer of light absorptive core material; and (e) removing at least a portion of the one or more layers of light absorptive cladding material, the layer of light absorptive core material and the additional one or more layers of light absorptive cladding material from the top surface of the light transmissive regions and bottom surface of the channels; wherein the concentration of light absorbing materials in each of the one or more layers of a light absorptive cladding material and each of the additional one or more layers of a light absorptive cladding material is less than $C_1$.

In still another aspect, we have discovered a method of making a light control film comprising (a) providing a microstructured film comprising a plurality of light transmissive regions alternated with channels, wherein the microstructured film has a surface defined by a top surface and side walls of the light transmissive regions and a bottoms surface of the channels; (b) applying one or more layers of a light absorptive cladding material, each layer having an extinction coefficient, to the surface; (c) applying a layer of a light absorptive core material having a first extinction coefficient, $k_1$, on the one or more layers of light absorptive cladding material; (d) applying an additional one or more layers of a light absorptive cladding material, each additional layer having an extinction coefficient, on the layer of light absorptive core material; and (e) removing at least a portion of the one or more layers of light absorptive cladding material, the layer of light absorptive core material and the additional one or more layers of light absorptive cladding material from the top surface of the light transmissive regions and bottom surface of the channels; wherein the extinction coefficient of each of the one or more layers of a light absorptive cladding material and each of the additional one or more layers of a light absorptive cladding material is less than $k_1$.

DETAILED DESCRIPTION

In one embodiment, a light control film ("LCF") is described. With reference to FIG. 1a, a cross-sectional view of an embodied LCF 100, the LCF comprises a light output surface 120 and an opposing light input surface 110. The light output surface 120 is typically parallel to the light input surface 110. LCF 100 includes alternating transmissive regions 130 and absorptive regions 140 disposed between the light output surface 120 and a light input surface 110. Absorptive regions 140 include core 141 and cladding layer 142.

In one embodiment, as depicted in FIG. 1a, the transmissive regions 130 are typically integral with a land region "L", meaning that there is no interface between the land region and the base portion 131 of the transmissive regions 130. Alternatively, LCF may lack such land region L or an interface may be present between the land region, L, and transmissive regions 130. In this embodiment, the land region is disposed between the alternating transmissive regions 130 and absorptive regions 140 and light input surface 110.

Alternatively, in another embodiment, surface 120 may be the light input surface and surface 110 may be the light output surface. In this embodiment, the land region is disposed between the alternating transmissive regions 130 and absorptive regions 140 and light output surface.

The transmissive regions 130 can be defined by a width "$W_T$". Excluding the land region "L", the transmissive regions 130 typically have nominally the same height as the absorptive regions 140. In typical embodiments, the height of the absorptive regions, $H_A$, is at least 30, 40, 50, 70, 80, 90 or 100 microns. In some embodiments, the height is no greater than 200, 190, 180, 170, 160, or 150 microns. In some embodiments, the height is no greater than 140, 130, 120, 110, or 100 microns. The LCF typically comprises a plurality of transmissive regions having nominally the same height and width. In some embodiments, the transmissive regions have a height, "$H_T$", a maximum width at its widest portion, "$W_T$", and an aspect ratio, $H_T/W_T$, of at least 1.75. In some embodiments, $H_T/W_T$ is at least 2.0, 2.5, 3.0, 3.5, 4.0, 4.5 or 5.0. In other embodiments, the aspect ratio of the transmissive regions is at least 2, 3, 4, 5, 6, 7, 8, 9 or 10. In other embodiments, the aspect ratio of the transmissive regions is at least 15, 20, 25, 30, 35, 40, 45, or 50.

Absorptive regions 140 have a height "$H_A$" defined by the distance between the bottom surface 155 and top surface 145, such top and bottom surfaces typically being parallel to the light output surface 120 and a light input surface 110. The absorptive regions 140 have a maximum width $W_A$ and are spaced apart along surface light output surface 120 by a pitch "$P_A$".

The width of the absorptive regions, "$W_A$", at the base (i.e. adjacent to bottom surface 155) is typically nominally the same as the width of the absorptive regions adjacent the top surface 145. However, when the width of the absorptive regions at the base differs from the width adjacent the top surface, the width is defined by the maximum width. The maximum width of a plurality of absorptive regions can be averaged for an area of interest, such as an area in which the transmission (e.g. brightness) is measured. The LCF typically comprises a plurality of absorptive regions having nominally the same height and width. In typical embodiments, the absorptive regions generally have a width no greater than 10, 9, 8, 7, 6, 5, 4, 3, 2, or 1 micron. In some embodiments, the absorptive regions generally have a width no greater than 5, 4, 3, 2, or 1 microns. In some embodiments, the absorptive regions have a width of at least 150, 160, 170, 180, 190, or 200 nanometers.

The absorptive region comprises a core sandwiched between one or more cladding layers. The cores have a width, "$W_{Acore}$", and the cladding layers have a width, "$W_{Acladding}$". In typical embodiments, the cores generally have a width no greater than 5, 4, 3, 2, or 1 micron. In some embodiments, the cores generally have a width no greater than 900, 800, 700, 600, 500, 400, 300, or 200 nanometers. In some embodiments, the cores have a width of at least 50, 60, 70, 80, 90, or 100 nanometers. In typical embodiments, each cladding layer generally has a width no greater than 4, 3, 2, or 1 micron. In some embodiments, each cladding layer generally has a width no greater than 900, 800, 700, 600, 500, 400, 300, or 200 nanometers. In some embodiments, each cladding layer has a width of at least 50, 60, 70, 80, 90, or 100 nanometers.

An absorptive region can be defined by an aspect ratio, the height of the absorptive region divided by the maximum width of the absorptive region ($H_A/W_A$). In some embodiments, the aspect ratio of the absorptive regions is at least 1, 2, 3, 4, 5, 6, 7, 8, 9, or 10. In favored embodiments, the height and width of the absorptive region(s) are selected such that the absorptive region(s) have an even higher aspect ratio. In some embodiments, the aspect ratio of the absorptive regions is at least 15, 20, 25, 30, 35, 40, 45, 50, 55, 60, 65, 70, 75, 80, 85, 90, 95 or 100. In other embodiments, the aspect ratio of the absorptive regions is at least 200, 300, 400, or 500. The aspect ratio can range up to 10,000 or greater. In some embodiments, the aspect ratio is no greater than 9,000; 8,000; 7,000; 6,000, 5,000; 4,000, 3000; 2,000, or 1,000.

Figure 1B:
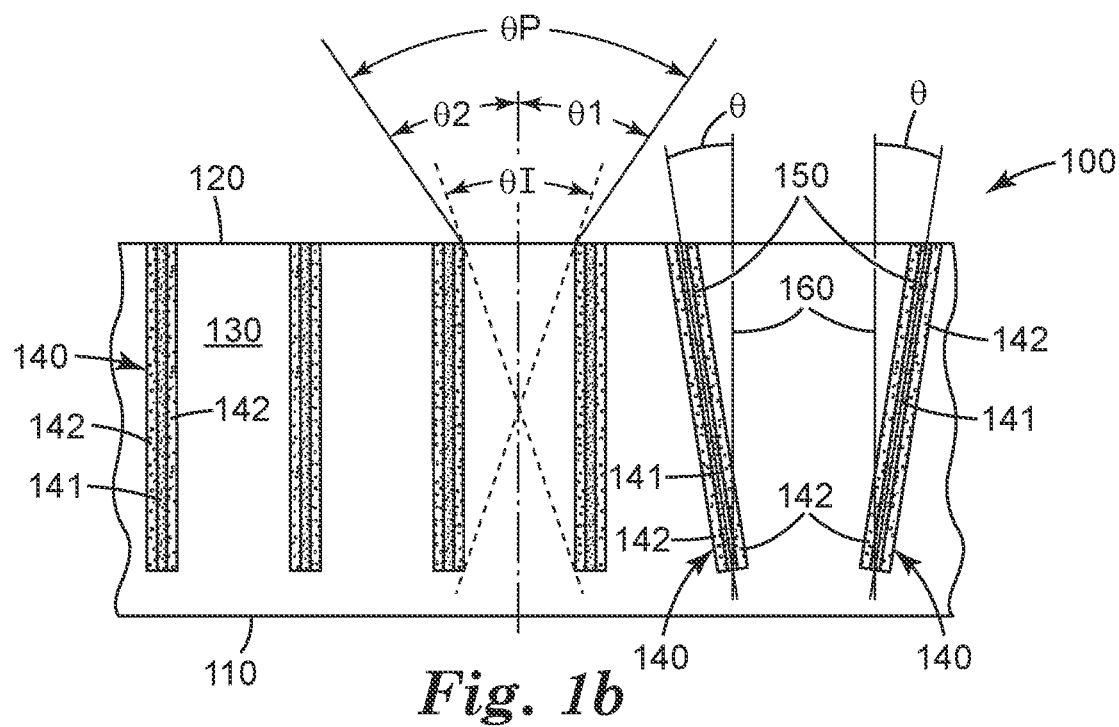
Figure 3C:
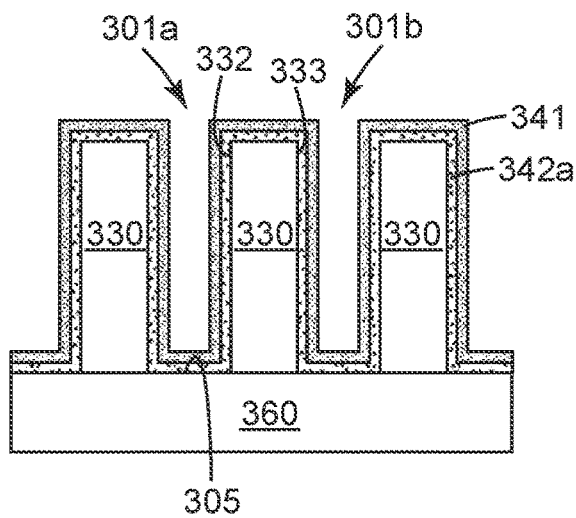
Figure 3D:
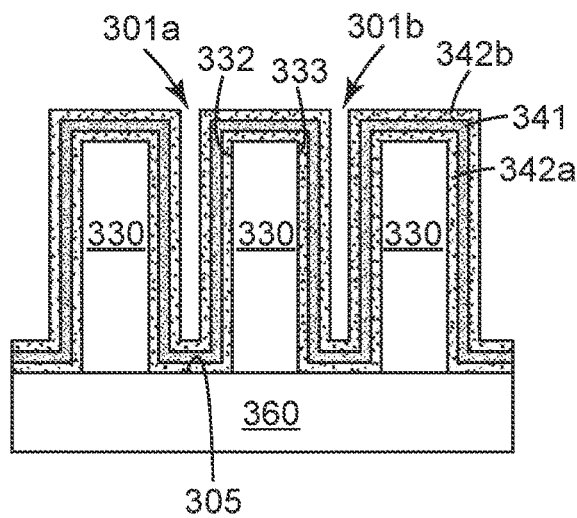
Figure 3E:
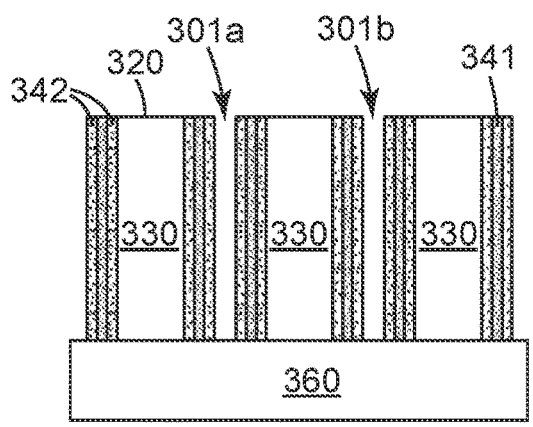
Figure 3F:
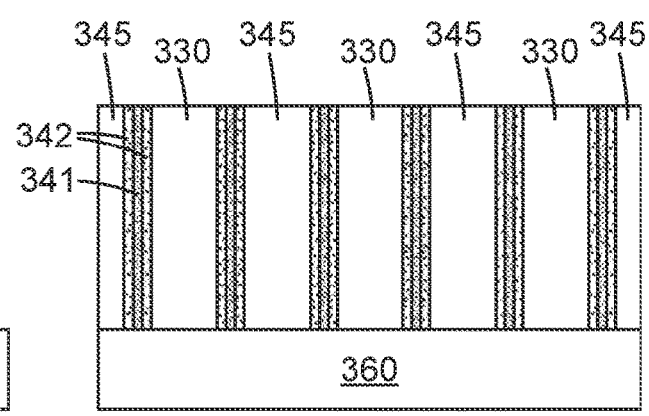

As shown in FIG. 1b, LCF 100 includes alternating transmissive regions 130 and absorptive regions 140 comprising core 141 and cladding layer 142, and an interface 150 between transmissive regions 130 and absorptive regions 140. Interface 150 forms a wall angle θ with line 160 that is perpendicular to light output surface 120.

Larger wall angles θ decrease transmission at normal incidence or in other words a viewing angle of 0 degrees Smaller wall angles are preferred such that the transmission of light at normal incidence can be made as large as possible. In some embodiments, the wall angle θ is less than 10, 9, 8, 7, 6, or 5 degrees. In some embodiments, the wall angle is no greater than 2.5, 2.0. 1.5, 1.0, 0.5, or 0.1 degrees. In some embodiments, the wall angle is zero or approaching zero. When the wall angle is zero, the angle between the absorptive regions and light output surface 120 is 90 degrees. Depending on the wall angle, the transmissive regions can have a rectangular or trapezoidal cross-section.

The transmission (e.g. brightness of visible light) can be increased when incident light undergoes total internal reflection (TIR) from the interface between the absorptive and transmissive regions. Whether a light ray will undergo TIR or not, can be determined from the incidence angle with the interface, and the difference in refractive index of the materials of the transmissive and absorptive regions.

As shown in FIG. 1b, transmissive regions 130 between absorptive regions 140 have an interface angle $θ_I$ defined by the geometry of alternating transmissive regions 130 and absorptive regions. As depicted in FIGS. 1a and 1b, the interface angle $θ_I$ can be defined by the intersection of two lines. The first line extends from a first point, defined by the bottom surface and the side wall surface of a first absorptive region, and a second point defined by the top surface and side wall surface of the nearest second absorptive region. The second line extends from a first point defined, by the top surface and the side wall surface of the first absorptive region, and a second point, defined by the bottom surface and side wall surface of the second absorptive region.

The polar cut-off viewing angle θP is equal to the sum of a polar cut-off viewing half angle θ1 and a polar cut-off viewing half angle θ2 each of which are measured from the normal to light input surface 110. In typical embodiments, the polar cut-off viewing angle θP is symmetric, and polar cut-off viewing half angle θ1 is equal to polar viewing half angle θ2. Alternatively, the polar cut-off viewing angle θP can be asymmetric, and polar cut-off viewing half angle θ1 is not equal to polar cut-off viewing half angle θ2.

Figure 4:
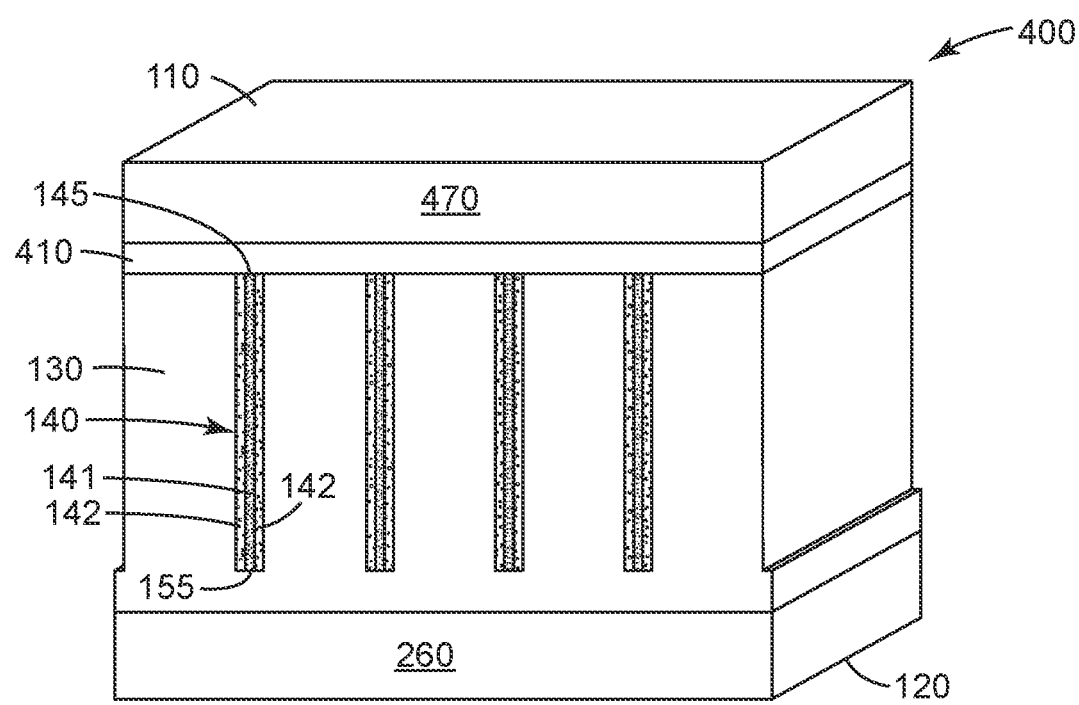
FIG. 4 is a perspective view of a light control film further comprising a cover film bonded with an adhesive layer.
Figure 6:
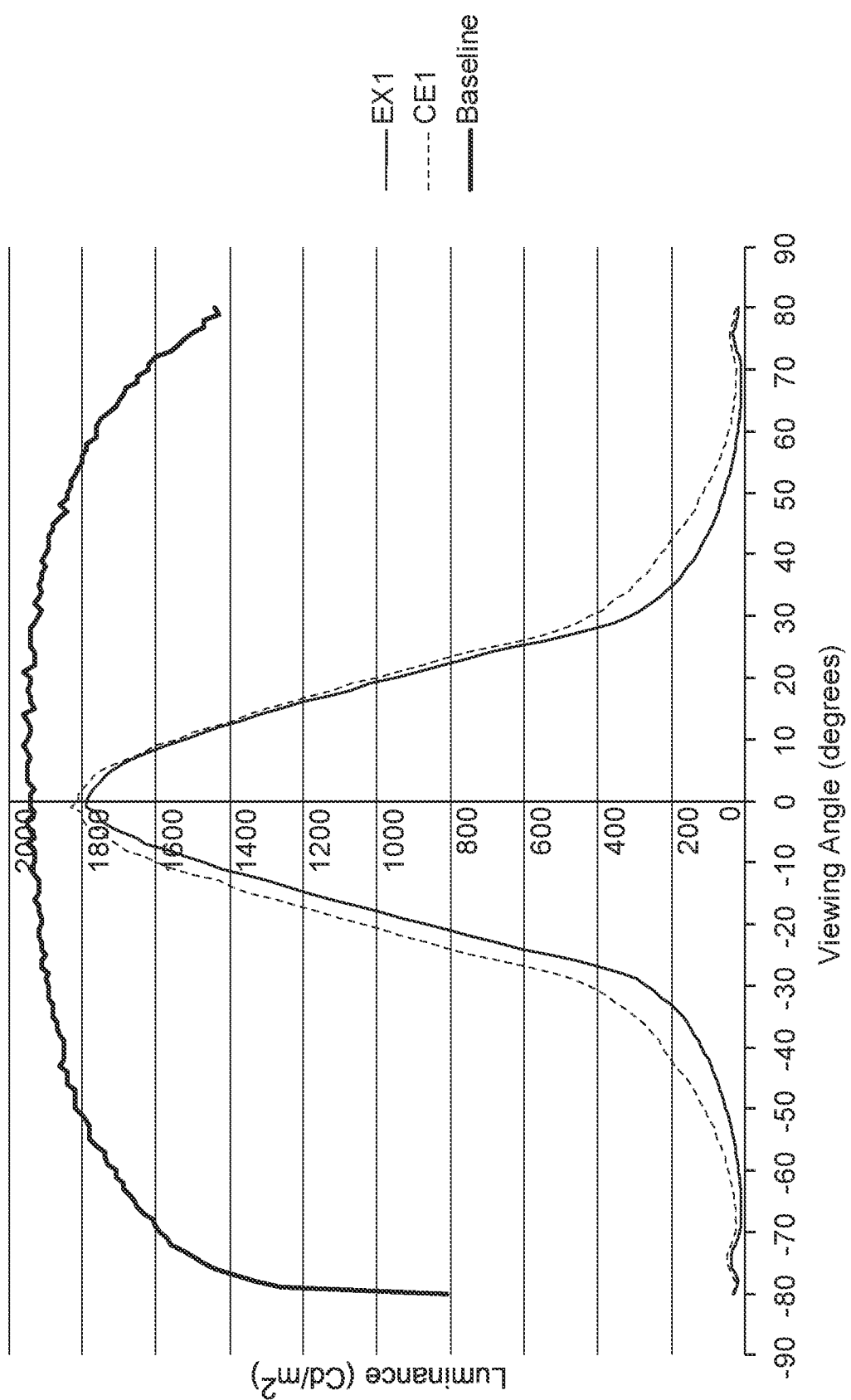
FIG. 6 is a plot of luminance versus viewing angle for various light control films.

Luminance can be measured according to the test method described in the examples. The luminance can be measured on the alternating transmissive and absorptive regions, such as illustrated in FIG. 1a or the total light control film that may further comprise a cover film, such as illustrated in FIG. 4. Relative transmission (e.g. brightness of visible light) is defined as the percentage of luminance, at a specified viewing angle or range of viewing angles, between a reading with the light control film including the alternating transmissive and absorptive regions and optionally other layers and a reading without the light control film (i.e. the baseline). With reference to FIG. 6, the viewing angle can range from −90 degrees to +90 degrees. A viewing angle of 0 degrees is orthogonal to light input surface 110; whereas viewing angles of −90 degrees and +90 degrees are parallel to light input surface 110.

For example, with reference to FIG. 6, the on-axis baseline luminance is 1940 Cd/m$^2$. EX. 1 has an on-axis luminance of 1790 Cd/m$^2$. Thus, the relative transmission (e.g. brightness) is 1790 Cd/m$^2$/1940 Cd/m$^2$ multiplied by 100, which equals 92.3%. Unless specified otherwise, the relative transmission refers to the relative transmission of visible light having a 400-700 nm wavelength range as measured by the test method described in further detail in the examples.

The alternating transmissive and absorptive regions or total LCF can exhibit increased relative transmission (e.g. brightness) at a viewing angle of 0 degrees. In some embodiments, the relative transmission (e.g. brightness) is at least 75, 80, 85, or 90%. The relative transmission (e.g. brightness) is typically less than 100%. In typical embodiments, the LCF has significantly lower transmission at other viewing angles. For example, in some embodiments, the relative transmission (e.g. brightness) at a viewing angle of −30 degrees, +30 degrees, or an average of −30 degrees and +30 degrees is less than 50, 45, 40, 35, 30, or 25%. In other embodiments, the relative transmission (e.g. brightness) at a viewing angle of 30 degrees, +30 degrees, or the average of −30 degrees and +30 degrees is less than 25, 20, 15, 10 or 5%. In some embodiments, the relative transmission (e.g. brightness) at a viewing angle of +/−35, +/−40, +/−45, +/−50, +/−55, +/−60, +/−65, +/−70, +/−75, or +/−80 degrees is less than 25, 20, 15, 10 or 5%, or less than 5%. In some embodiments, the average relative transmission (e.g. brightness) for viewing angles ranging from +35 to +80 degrees, −35 to −80 degrees, or the average of these ranges is less than 10, 9, 8, 7, 6, 5, 4, 3, or 2%.

LCFs with significantly lower transmission at "off-axis" viewing angles (e.g., beyond about 30 degrees) are suitable for use as privacy films. Such films allow a viewer directly in front of a display (viewing angle of 0 degrees) to see the image, yet blocks viewers at "off-axis" angles from seeing such image.

The absorptive regions can be formed by coating the surface of a microstructured film. FIG. 2 shows an embodied microstructured film article 200 that can be coated to make a LCF. The depicted microstructured film includes a microstructured top surface comprising a plurality of channels 201a-201d on base layer 260. As shown in FIG. 2, a continuous land layer "L" can be present between the bottom of the channels 205 and the top surface 210 of base layer 260. Alternatively, the channels 201 can extend all the way through the microstructured film article 200 to base layer 260. In this embodiment (not shown), the bottom surface 205 of the groove can be coincident with the top surface 210 of a base layer 260. In typical embodiments, the base layer 260 is a preformed film that comprises a different organic polymeric material than the transmissive regions 230 as will subsequently be described.

The height and width of protrusions (e.g. transmissive regions) 230 are defined by adjacent channels (e.g. 201a and 201b). The protrusions (e.g. transmissive regions) 230 can be defined by a top surface 220, a bottom surface, 231, and side walls 232 and 233 that join the top surface to the bottom surface. The side walls can be parallel to each other. More typically the side walls have a wall angle as previously described.

In some embodiments, the protrusions (e.g. transmissive regions) 230 have a pitch, "PT" of at least 10 microns. The pitch is the distance between the onset of a first protrusion (e.g. transmissive region) and the onset of a second protrusion (e.g. transmissive region) as depicted in FIG. 2. The pitch may be at least 15, 20, 25, 30, 35, 40, 45, or 50 microns. The pitch is generally no greater than 1 mm. The pitch is typically no greater than 900, 800, 700, 600, or 500 microns. In some embodiments, the pitch is typically no greater than 550, 500, 450, 400, 350, 300, 250 or 200 microns. In some embodiments, the pitch is no greater than 175, 150, 100 microns. In typical embodiments, the protrusions are evenly spaced, having a single pitch. Alternatively, the protrusions may be spaced such that the pitch between adjacent protrusions is not the same. In this later embodiment, at least some and typically the majority (at least 50, 60, 70, 80, 90% or greater of the total protrusions) have the pitch just described.

The pitch of the absorptive regions $P_A$ is within the same range as just described for the light transmissive regions.

The pitch and height of the protrusions (e.g. transmissive regions) can be important to facilitate coating of the protrusions (e.g. transmissive regions) with light absorbing coatings. When the protrusions are spaced too close together it can be difficult to uniformly coat the side walls. When the protrusions are spaced too far apart, the light absorbing coating may not be effective at providing its intended function, such as privacy at off-axis viewing angles.

The absorptive regions are formed by providing two or more light absorptive coating on the side walls of protrusions (e.g. transmissive regions) of a microstructured film. The combined thicknesses of the light absorptive coatings are equivalent to the width of the absorptive regions, $W_A$, as previously described. The absorptive regions can be formed by any method that provides a sufficiently thin, conformal, light absorptive coating on the side walls (e.g. 232, 233). As used herein, the term "conformal" or "conformal coating" means a coating having a thickness varying by less than 20% throughout the middle 80% of $H_A$.

In one embodiment, the absorptive regions are formed by a combination of additive and subtractive methods.

With reference to FIGS. 3a-3f, the light control film can be prepared by providing a microstructured film 300 (such as the microstructured film of FIG. 2) comprising a plurality of protrusions (e.g. transmissive regions) defined by a top surface (e.g. 320) and side walls (332, 333). The plurality of protrusions (e.g. transmissive regions) 330 are separated from each other by channels 301a and 301b. The side walls of the protrusions (e.g. transmissive regions) are coincident with the side walls of the channels. The channels further comprise a bottom surface 305 that is parallel to or coincident with top surface of base layer 360. The method further comprises applying a light absorptive cladding coating 342a to the (e.g. entire) surface of the microstructured film, i.e. the top surface 320 and side walls 332, 333 of the protrusions (e.g. transmissive regions) and the bottom surface 305 of the channels that separate the protrusions (e.g. transmissive regions). In some embodiments, more than one light absorptive cladding coating is applied. The method further comprises applying a light absorptive core coating 341 to the (e.g. entire) surface of the cladding coating. The method further comprises applying another light absorptive cladding coating 342b to the (e.g. entire) surface of the light absorptive core coating. The method further comprises substantially removing the coatings from the top surface 320 of the protrusions (e.g. transmissive regions) and bottom surface 305 of the channels. As used herein, the term "substantially removing the coatings" acknowledges that some residue may remain. In some embodiments, the method further comprises filling the channels with an organic polymeric material 345 such as (e.g. the same) polymerizable resin as the protrusions (e.g. transmissive regions) and curing the polymerizable resin. When the channels are not filled with a cured polymerizable resin, the channels are typically filled with air.

A microstructure-bearing article (e.g. microstructured film article 200 shown in FIG. 2) can be prepared by any suitable method. In one embodiment, the microstructure-bearing article (e.g. microstructured film article 200 shown in FIG. 2) can be prepared by a method including the steps of (a) preparing a polymerizable composition; (b) depositing the polymerizable composition onto a master negative microstructured molding surface (e.g. tool) in an amount barely sufficient to fill the cavities of the master; (c) filling the cavities by moving a bead of the polymerizable composition between a (e.g. preformed film) base layer and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. When the base layer is a preformed film, one or more of the surfaces of the film can optionally be primed or otherwise be treated to promote adhesion with the organic material of the light transmissive regions.

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof.

The polymerizable resin can be a radiation curable polymeric resin, such as a UV curable resin. In some cases, polymerizable resin compositions useful for the LCF of the present invention can include polymerizable resin compositions such as are described in U.S. Pat. No. 8,012,567 (Gaides et al.), to the extent that those compositions satisfy the index and absorption characteristics herein described.

The chemical composition and thickness of the base layer can depend on the end use of the LCF. In typical embodiments, the thickness of the base layer can be at least about 0.025 millimeters (mm) and can be from about 0.05 mm to about 0.25 mm.

Useful base layer materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base layer can contain mixtures or combinations of these materials. In some embodiments, the base layer may be multi-layered or may contain a dispersed component suspended or dispersed in a continuous phase.

Examples of base layer materials include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN® polycarbonate film 8010, available from GE Polymershapes, Seattle Wash., and Panlite 1151, available from Teijin Kasei, Alpharetta Ga.

Some base layers can be optically active, and can act as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. No. 5,825,543 (Ouderkirk et al.); U.S. Pat. No. 5,783,120 (Ouderkirk et al.); U.S. Pat. No. 5,882,774 (Jonza et al.); U.S. Pat. No. 5,612,820 (Shrenk et al.) and U.S. Pat. No. 5,486,949 (Shrenk et al.). The use of these polarizer films in combination with prismatic brightness enhancement film has been described, for example, in U.S. Pat. No. 6,111,696 (Allen et al.) and U.S. Pat. No. 5,828,488 (Ouderkirk et al.). Films available commercially are multi-layer reflective polarizer films such as 3M™ Dual Brightness Enhancement Film "DBEF", available from 3M Company.

In some embodiments, the base layer is a multilayer film that imparts a color shifting effect such as described in U.S. Pat. No. 8,503,122. Suitable color shifting films are described in U.S. Pat. No. 6,531,230 to Weber et al.; incorporated herein by reference.

Other suitable color shifting films include multilayer films generated by spin coating, blade coating, dip coating, evaporation, sputtering, chemical vapor deposition (CVD), and the like. Exemplary films include both organic and inorganic materials. Such films are described, for instance, in U.S. Pat. Nos. 7,140,741; 7,486,019; and 7,018,713. Alternatively, the microstructure-bearing article (e.g. microstructured film article 200 shown in FIG. 2) can be prepared by melt extrusion, i.e. casting a fluid resin composition onto a master negative microstructured molding surface (e.g. tool) and allowing the composition to harden. In this embodiment, the protrusions (e.g. light transmissive regions) are interconnected in a continuous layer to base layer 260. The individual protrusions (e.g. light transmissive regions) and connections therebetween generally comprises the same thermoplastic material. The thickness of the land layer (i.e. the thickness excluding that portion resulting from the replicated microstructure) is typically between 0.001 and inches and preferably between 0.003 and 0.010 inches.

Suitable resin compositions for melt extrusion are transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index.

In yet another embodiment, the master negative microstructured molding surface (e.g. tool) can be employed as an embossing tool, such as described in U.S. Pat. No. 4,601,861 (Pricone).

The absorptive regions are generally formed by coating the surface of a microstructured film. Various coating methods can be used including for example layer-by-layer (LbL) coating, vapor deposition, sputtering, reactive sputtering and atomic layer deposition (ALD).

Light absorbing materials useful for forming the core and cladding layer(s) of the light absorbing regions can be any suitable material that functions to absorb or block light at least in a portion of the visible spectrum. Preferably, the light absorbing material can be coated or otherwise provided on the side walls of the light transmissive regions to form light absorbing regions in the LCF. Exemplary light absorbing materials include a black or other light absorbing colorant (such as carbon black or another pigment or dye, or combinations thereof). Other light absorbing materials can include particles or other scattering elements that can function to block light from being transmitted through the light absorbing regions. The light absorbing materials in the core and cladding layers may be the same or different.

When a light absorbing material (e.g. coating) includes particles, the particles have a median particle size D50 equal to or less than the thickness of the light absorbing material (e.g. coating) or in other words substantially less than the width of the absorptive regions $W_A$.

The median particle size is generally less than 1 micron. In some embodiments, the median particle size is no greater than 900, 800, 700, 600, or 500 nm. In some embodiments, the median particle size is no greater than 450, 400, 350, 300, 250, 200, or 100 nm. In some embodiments, the median particle size is no greater than 90, 85, 80, 75, 70, 65, 60, 55, or 50 nm. In some embodiments, the median particle size is no greater than 30, 25, 20, or 15 nm. The median particle size is typically at least 1, 2, 3, 4, or 5 nanometers. The particle size of the nanoparticles of the absorptive regions can be measured using transmission electron microscopy or scanning electron microscopy, for example.

"Primary particle size" refers to the median diameter of a single (non-aggregate, non-agglomerate) particle. "Agglomerate" refers to a weak association between primary particles which may be held together by charge or polarity and can be broken down into smaller entities. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles (e.g. of the coating solution) are present as discrete unagglomerated nanoparticles.

The concentration of light absorbing nanoparticles in the core is typically at least 10, 15, 20, 25, 30, 35, 40, 45, or 50 wt. % of the total light absorptive core region. In some embodiments, the concentration of light absorbing nanoparticles in the core is at least 55, 60, 65, 70, 75, 80, 85, 90 or 95 wt. % of the total light absorptive core regions. In some embodiments, the concentration of light absorbing nanoparticles in the core is 100 wt. %. In some embodiments, the concentration of light absorbing nanoparticles in the cores is 30-100 wt. % or 75-90 wt. % of the total light absorptive core regions.

The concentration of light absorbing nanoparticles in the one or more cladding layers is less than the concentration of light absorbing nanoparticles in the core. The concentration of light absorbing nanoparticles in the cladding layer(s) is typically at least 0.5, 1, 5, 10, 15, 20, 25, 30, 35, 40 or 45 wt. % of the total cladding layer. In some embodiments the concentration of light absorbing nanoparticles in the cladding layer(s) is no more than 20, 25, 30, 35, 40, 45, 50, 55, 60, 70, or 75 wt. % of the total cladding layer. In some embodiments, the concentration of light absorbing nanoparticles in the cladding layers is 0.5-50 wt. % or 25-45 wt. % of the total cladding layer. In some embodiments, the concentration of light absorbing nanoparticles is at least 30% less than the concentration of light absorbing nanoparticles in the core.

In some embodiments, the cladding layers further comprise non-light absorbing diluent. As used herein, the term "non-light absorbing" means that the diluent does not substantially absorb visible light (e.g., 400-700 nm wavelengths) or is transparent (i.e., having an extinction coefficient across the visible light spectrum close to zero, for example, less than 0.01 or less than 0.001). In some embodiments, the non-light absorbing diluent comprises an inorganic material, such as nano-silica particles. In some embodiments, the non-light absorbing diluent is an organic material. Suitable organic materials include acrylic emulsions, polyurethane dispersions, sulfopolyesters, and other types of aqueous latexes. The particles must possess sufficient surface charge (either anionic or cationic) to deposit via electrostatic-based layer-by-layer assembly. The preferable particle diameter (i.e., median particle diameter, d50) is less than 500 nm, more preferably less than 250 nm. An example anionic acrylic emulsion is NeoCryl® A-639 available from DSM Coating Resins (Wilmington, Massachusetts). An example anionic polyurethane dispersion is Impranil® DLC-F available from Covestro (Pittsburgh, Pennsylvania). An example sulfopolyester is Eastek 1100 available from Eastman Chemical (Kingsport, Tennessee). The diluents can be mixed with carbon black and co-deposited; alternatively, the diluents can be prepared as separate coating solutions and deposited in separate layers from the carbon black.

The concentration of light absorbing nanoparticles can be determined by methods known in the art, such as thermogravimetric analysis.

The extinction coefficient of the cores is typically 0.1 to 0.5. In some embodiments the extinction coefficient of the cores is 0.2 to 0.4.

The extinction coefficient of the cladding layer(s) is less than the extinction coefficient of the cores. The extinction coefficient of the cladding layer(s) is 0.005 to 0.15. In some embodiments, the extinction coefficient of the cladding layer(s) is 0.01 to 0.1. In some embodiments, the extinction coefficient of the cladding layer(s) is at least 50% less than the extinction coefficient of the cores. The extinction coefficient, k, of a thin film coating can be determined, for example, via either ellipsometry or UV/Vis spectroscopy. k is defined as $\alpha\lambda/(4\pi)$ where a is the absorption coefficient and $\lambda$ is wavelength. For a thin film coating on a transparent substrate, one can use UV/Vis spectroscopy to measure the absorptance (A) as 1−T−R, where T is transmittance and R is reflectance. The measured A must be appropriately corrected for the A of the substrate to obtain A of the thin film itself. A is then converted to $\alpha$ by the equation $\alpha=-\ln[(100-A)/100]/h$ where h is the thickness of the thin film coating; this equation for $\alpha$ is an approximation used when R is relatively small, and A is relatively large. Thickness can be measured, for example, by stylus profilometry or cross-sectional scanning electron microscopy.

In one embodiment, the method comprises applying a layer-by layer light absorptive coating (i.e. core and cladding layer coatings) to the surface of the microstructured film, i.e. the top surface and side walls of the protrusions and bottom surface of the channels.

In some embodiments, the plurality of layers disposed on the surface of the microstructured film comprise at least two bi-layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. "Polyelectrolyte" means a polymer or compound with multiple ionic groups capable of electrostatic interaction. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids). Typically, this deposition process involves exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. polyelectrolyte bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. polyelectrolyte or inorganic oxide nanoparticle bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable processes include those described in Krogman et al., U.S. Pat. No. 8,234,998; Hammond-Cunningham et al., US2011/0064936; and Nogueira et al., U.S. Pat. No. 8,313,798. Layer-by layer dip coating can be conducted using a StratoSequence VI (nanoStrata Inc., Tallahassee, FL) dip coating robot.

In one embodiment, the plurality of bi-layers deposited by layer-by-layer self-assembly is a polyelectrolyte stack comprising an organic polymeric polyion (e.g. cation) and counterion (e.g. anion) comprising a light absorbing material (e.g. pigment). At least a portion of the cation layers, anion layers, or a combination thereof comprise a light absorbing material (e.g. pigment) ionically bonded to the polyelectrolyte. It should be appreciated that individual bi-layers in the final article may not be distinguishable from each other by common methods in the art such as scanning electron microscopy (SEM) or transmission electron microscopy (TEM).

The thickness of a bi-layer and the number of bi-layers are selected to achieve the desired light absorption. In some embodiments, the thickness of a bi-layer, the number of bi-layers are selected to achieve the desired (e.g. absorption) optical properties using the minimum total thickness of self-assembled layers and/or the minimum number of layer-by-layer deposition steps. The thickness of each bi-layer typically ranges from about 5 nm to 350 nm. The number of bi-layers is typically at least 5, 6, 7, 8, 9, or 10. In some embodiments, the number of bilayers per stack is no greater than 150 or 100. The thickness of a stack is equivalent to the width of the absorptive regions $W_A$, as previously described.

A light absorbing compound is dispersed within at least a portion of the polyelectrolyte layers. Various polyelectrolytes can be utilized including inorganic compounds, such as silica or silicate, as well as various phosphonocarboxylic acids and salts thereof (some of which are described in WO2015/095317; incorporated herein by reference.)

Polyelectrolyte organic polymers can be preferred since such materials can be more easily removed by reactive ion etching than inorganic materials.

Suitable polycationic organic polymers include, but are not limited to linear and branched poly(ethylenimine) (PEI), poly(allylamine hydrochloride), polyvinylamine, chitosan, polyaniline, polyamidoamine, poly(vinylbenzyltriamethylamine), polydiallyldimethylammonium chloride (PDAC), poly(dimethylaminoethyl methacrylate), poly(methacryloylamino)propyl-trimethylammonium chloride, and combinations thereof including copolymers thereof.

Suitable polyanionic organic polymers include, but are not limited to, poly(vinyl sulfate), poly(vinyl sulfonate), poly(acrylic acid) (PAA), poly(methacrylic acid), poly(styrene sulfonate), dextran sulfate, heparin, hyaluronic acid, carrageenan, carboxymethylcellulose, alginate, sulfonated tetrafluoroethylene based fluoropolymers such as Nafion®, poly(vinylphosphoric acid), poly(vinylphosphonic acid), and combinations thereof including copolymers thereof.

The molecular weight of the polyelectrolyte polymers can vary, ranging from about 1,000 g/mole to about 1,000,000 g/mole. In some embodiments, the molecular weight (Mw) of the (e.g. poly(acrylic acid)) negatively charged anionic layer ranges from 50,000 g/mole to 150,000 g/mole. In some embodiments, the molecular weight (Mw) of the (e.g. polydiallyldimethylammonium chloride) positively charged cationic layer ranges from 50,000 g/mole to 300,000 g/mole. In some embodiments, the molecular weight (Mw) of the (e.g. poly(ethylenimine)) positively charged cationic layer ranges from 10,000 g/mole to 50,000 g/mole. At least one of the polyions (e.g. the polyanion or polycation) comprises a light absorbing material.

In order to be stable in water as a colloidal dispersion and impart polyionic groups, the light absorbing (e.g. pigment) particles typically further comprise an ionic surface treatment. In some embodiments, the surface treatment compound is anionic, such as in the case of sulfonate or carboxylate. The light absorbing (e.g. pigment) particles also function as the ionic binding group for the alternating polyelectrolyte layer.

Suitable pigments are available commercially as colloidally stable water dispersions from manufacturers such as Cabot, Clariant, DuPont, Dainippon and DeGussa. Particularly suitable pigments include those available from Cabot Corporation under the CAB-O-JET® name, for example 250C (cyan), 260M (magenta), 270Y (yellow) or 352K (black). The light absorbing (e.g. pigment) particles are typically surface treated to impart ionizable functionality. Examples of suitable ionizable functionality for light absorbing (e.g. pigment) particles include sulfonate functionality, carboxylate functionality as well as phosphate or bisphosphonate functionality. In some embodiments, surface treated light absorbing (e.g. pigment) particles having ionizable functionality are commercially available. For example, CAB-O-JET® pigments, commercially available from Cabot Corporation, sold under the trade names 250C (cyan), 260M (magenta), 270Y (yellow) and 200 (black), comprise sulfonate functionality. Yet another example, CAB-O-JET® pigments commercially available from Cabot Corporation, under the trade names 352K (black) and 300 (black), comprise carboxylate functionality.

When the light absorbing (e.g. pigment) particles are not pre-treated, the light absorbing (e.g. pigment) particles can be surface treated to impart ionizable functionality as known in the art.

Multiple light absorbing materials (e.g. pigments) may be utilized to achieve a specific hue or shade or color in the final product. When multiple light absorbing materials (e.g. pigments) are used, the materials are selected to ensure their compatibility and performance both with each other and with the optical product components.

In favored embodiments, the polyelectrolyte is prepared and applied to the microstructured surface as an aqueous solution. The term "aqueous" means that the liquid of the coating contains at least 85 percent by weight of water. It may contain a higher amount of water such as, for example, at least 90, 95, or even at least 99 percent by weight of water or more. The aqueous liquid medium may comprise a mixture of water and one or more water-soluble organic cosolvent(s), in amounts such that the aqueous liquid medium forms a single phase. Examples of water-soluble organic cosolvents include methanol, ethanol, isopropanol, 2-methoxyethanol, 3-methoxypropanol, 1-methoxy-2-propanol, tetrahydrofuran, and ketone or ester solvents. The amount of organic cosolvent typically does not exceed 15 wt-% of the total liquids of the coating composition. The aqueous polyelectrolyte composition for use in layer-by-layer self-assembly typically comprises at least 0.01 wt-%, 0.05 wt-% or 0.1 wt-% of polyelectrolyte and typically no greater than 5 wt-%, 4 wt-%, 3 wt-%, 2 wt-% or 1 wt-%.

In some embodiments, the aqueous solutions further comprise a "screening agent", an additive that promotes even and reproducible deposition by increasing ionic strength and reducing interparticle electrostatic repulsion. Suitable screening agents include any low molecular weight salts such as halide salts, sulfate salts, nitrate salts, phosphate salts, fluorophosphate salts, and the like. Examples of halide salts include chloride salts such as LiCl, NaCl, KCl, $CaCl_2$), $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents.

Suitable screening agent concentrations can vary with the ionic strength of the salt. In some embodiments, the aqueous solution comprises (e.g. NaCl) screening agent at a concentration ranging from 0.01 M to 0.1M. The absorptive regions may contain trace amounts of screening agent.

After applying and drying the light absorbing coating to the (e.g. entire) surface of the micro structured film, the light absorbing coating is then removed from the top portions of the transmissive (e.g. protrusions) regions and also removed from the land regions, between the transmissive (e.g. protrusions) regions. It is appreciated that the LCF can have improved on-axis transmission (e.g. brightness) even when some of the light absorbing coating is retained.

Any suitable method can be used to selectively remove the light absorbing material from the top surface of the protrusions (e.g. light absorbing regions) and bottom surface of the channels.

In one embodiment, the light absorbing material is removed by reactive ion etching. Reactive ion etching (RIE) is a directional etching process utilizing ion bombardment to remove material. RIE systems are used to remove organic or inorganic material by etching surfaces orthogonal to the direction of the ion bombardment. The most notable difference between reactive ion etching and isotropic plasma etching is the etch direction. Reactive ion etching is characterized by a ratio of the vertical etch rate to the lateral etch rate which is greater than 1. Systems for reactive ion etching are built around a durable vacuum chamber. Before beginning the etching process, the chamber is evacuated to a base pressure lower than 1 Torr, 100 mTorr, 20 mTorr, 10 mTorr, or 1 mTorr. An electrode holds the materials to be treated, and is electrically isolated from the vacuum chamber. The electrode may be a rotatable electrode in a cylindrical shape. A counter electrode is also provided within the chamber and may be comprised of the vacuum reactor walls. Gas comprising an etchant enters the chamber through a control valve. The process pressure is maintained by continuously evacuating, chamber gases through a vacuum. pump. The type of gas used varies depending on the etch process. Carbon tetrafluoride ($CF_4$), sulfur hexafluoride ($SF_6$), octafluoropropane ($C_3F_8$), fluoroforin ($CHF_3$), boron trichloride ($BCl_3$), hydrogen bromide (HBr), chlorine, argon, and oxy gen are commonly used for etching. RF power is applied to the electrode to generate a plasma. Samples can be conveyed on the electrode through plasma for a controlled time period to achieve a specified etch depth.

Reactive ion etching is known in the art and further described in U.S. Pat. No. 8,460,568; incorporated herein by reference.

In some embodiments, the step of reactive ion etching results in the absorptive regions being narrower (less than the average width) near the bottom surface 311 of the channels. Removing the light absorbing material can result in a (e.g. slight) increase in the depth of the channels.

After removing the light absorbing coating from the bottom surface of the channels, the channels can be filled with an organic polymeric material. In some embodiments, the organic polymeric material is a polymerizable resin composition and the method further comprising (e.g. radiation) curing the polymerizable resin. Typically, the same polymerizable resin used in the manufacture of the microstructured film is utilized for filling the channels. Alternatively, a different organic polymeric material (e.g. polymerizable resin composition) is used. When a different organic polymer material (e.g. polymerizable resin composition) is used, the composition is typically selected to be index matched to the light transmissive regions. By "index matched", it is meant that the difference in refractive index between the filling material and transmissive regions is typically less than 0.1 or 0.005. Alternatively, the channels may be filled with a different organic polymeric material (e.g. polymerizable resin composition) having a difference in refractive index of greater than 0.1. In yet another embodiment, the channels are not filled with an organic polymeric material (e.g. polymerized resin). In this embodiment, the channels typically comprise air, having a refractive index of 1.0.

When the channels are filled with a cured polymerizable resin, the light control film may optionally include cover film 470 bonded to the microstructured film with adhesive 410, as illustrated in FIG. 4. When the channels are filled with air, the adhesive film and cover film are typically included.

In yet another embodiment, layer 410 may be a topcoat rather than adhesive. In this embodiment, cover film 470 may not be present.

FIG. 4 shows an LCF 400 that further includes an optional cover film 470 that can be the same, or different than, base layer 260. Optional cover film 470 can be bonded to the microstructured surface with an adhesive 410. Adhesive 410 can be any optically clear adhesive, such as a UV-curable acrylate adhesive, a transfer adhesive, and the like.

The LCF may further comprise other coatings typically provided on the exposed surface. Various hardcoats, antiglare coatings, antireflective coatings, antistatic, and antisoiling coatings are known in the art. See for example U.S. Pat. Nos. 7,267,850; 7,173,778, PCT Publication Nos. WO2006/102383, WO2006/025992, WO2006/025956 and U.S. Pat. No. 7,575,847.

Figure 5:
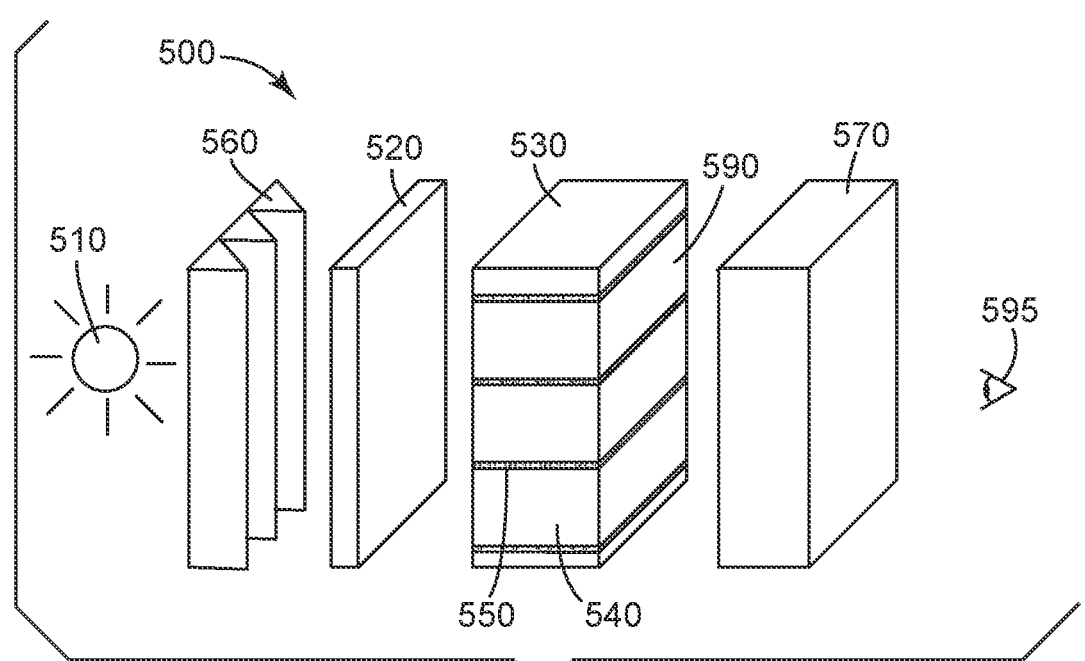
FIG. 5 is a perspective schematic of a backlit display comprising an embodied light control film.

FIG. 5 shows a perspective schematic of a backlit display 500 according to one embodiment. Backlit display 500 includes an LCF 530 comprising transmissive regions 540 and absorptive regions 550 as previously described. Such LCF has a polar cut-off viewing angle θP, as previously described, of light leaving an output surface 590 of LCF 530. Backlit display 500 includes a light source 510 configured to transmit light through LCF 530, through an image plane 520, such as an LCD panel, and on to a viewer 595. The viewing angle at which the brightness is a maximum, can depend on the polar cut-off viewing angle as previously described.

Backlit display 500 can also include an optional brightness enhancement film 560 and a reflective polarizer film 570 to further improve the brightness and uniformity of the display. Brightness enhancement film can be a prism film, such as 3M™ Brightness Enhancement Film "BEF" or Thin Brightness Enhancement Film "TBEF", available from 3M Company. Reflective polarizer film 570 can be a multilayer optical film, such as 3M™ Dual Brightness Enhancement Film "DBEF", available from 3M Company, St. Paul, MN. Brightness enhancement film 560 and reflective polarizer film 570, if included, can be positioned as shown in FIG. 5.

In other embodiments, the light control film comprising transmissive regions and absorptive regions, as previously described, can be bonded to an emissive (e.g. an organic light emitting diode, or OLED) display.

In some embodiments, the LCF described herein (i.e. a first LCF) can be combined with a second LCF. In some embodiments, the second LCF may be a LCF (e.g. privacy film) such described in U.S. Pat. Nos. 6,398,370; 8,013,567; 8,213,082; and 9,335,449. In other embodiments, the second LCF is an LCF as described herein (e.g. wherein the light absorbing regions have an aspect ratio of at least 30). The first and second LCFs can be stacked in various orientations.

In one embodiment, the first and second light control films are positioned such that the absorptive regions of the first LCF are parallel and typically coincident with the absorptive regions of the second LCF. In another embodiment, the first and second light control films are positioned such that the absorptive regions of the first LCF are orthogonal with the absorptive regions of the second LCF. The first and second light control films can also be positioned such that the absorptive regions range from being parallel to orthogonal with each other at a viewing angle of 0 degrees.

In some embodiments, the combination of first and second LCF has a relative transmission (e.g. brightness) of at least 60, 65, 70, 75, 80, 85, or 90% at a viewing angle of 0 degrees. In some embodiments, the relative transmission (e.g. brightness) at a viewing angle of +30 degrees, −30 degrees, or the average of +30 and −30 degrees is less than 25, 20, 15, 10, or 5%. In some embodiments, the average relative transmission (e.g. brightness) for viewing angles ranging from +35 to +80 degrees, −35 degrees to −85 degrees, or the average of these ranges is less than 10, 9, 8, 7, 6, 5, 4, 3, 2, or 1%.

In some embodiments, this combination of LCF has a relative transmission (e.g. brightness) of at least 60, 65, 70, 75, 80, 85, or 90% at a viewing angle of 0 degrees. In some embodiments, the relative transmission (e.g. brightness) at a viewing angle of +30 degrees, −30 degrees, or the average of +30 and −30 degrees is less than 25, 20, 15, 10, or 5%.

When the channels are filled with air, the relative transmission (e.g. brightness) at higher viewing angles can be lower, and thus the film can exhibit improved privacy.

The light control films described herein are particularly useful as a component of a display device as a so-called hybrid privacy filter. The hybrid privacy filter may be used in conjunction with a display surface, wherein light enters the hybrid privacy filter on the input side of the light control film and exits the hybrid privacy filter or film stack at the color shifting film. A great number of electronic devices with displays may be used in conjunction with the present invention including laptop monitors, external computer monitors, cell phone displays, televisions, smart phones, automotive center information displays, automotive driver information displays, automotive side mirror displays (also referred to as e-mirrors), consoles, or any other similar LCD, OLED, micro-LED, or mini-LED based display. An additional benefit to applying hybrid privacy filters to a display is for contrast enhancement.

Other types of backlit display imaging devices are also contemplated, including non-electronic displays such as sunglasses, document coversheets, console switches in auto and aviation applications, airplane cockpit controls, helicopter cockpit controls, windows and any number of others.

In further embodiments, the light control film stacks described herein may be useful as coverings for glass. For instance, the film stacks may be laminated onto or within fenestrations. The fenestrations may be selected from a glass panel, a window, a door, a wall, and a skylight unit. These fenestrations may be located on the outside of a building or on the interior. They may also be car windows, train windows, airplane passenger windows, or the like. Advantages of incorporating these film stacks into fenestrations include reduced IR transmission (which may lead to increased energy savings), ambient light blocking, privacy, and decorative effects.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by

EXAMPLES

Objects and advantages of this invention are further illustrated by the following examples, but the particular materials and amounts thereof recited in these examples, as well as other conditions and details, should not be construed to unduly limit this invention.

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Missouri.

Brief descriptions and sources for the materials used for the examples are presented in (3) separate tables. The components of Resin A used in the cast-and-cure microreplication process (Preparative Example 1) as well as the index-matched backfill material in Examples 1-2 are listed in Table 1. The raw materials for the layer-by-layer (LBL) coating are listed in Table 2. The raw materials for reactive ion etching (RIE) are listed in Table 3.

TABLE 1

Raw materials for Resin A

| Material | Abbreviation | Source |
| --- | --- | --- |
| Aliphatic urethane diacrylate Viscosity 5900 mPa.s at 60° C. Tensile Strength 2060 psi Tg = −7° C. | Photomer 6010 | BASF |
| Ethoxylated (10) bisphenol A diacrylate | SR602 | Sartomer (Exton, PA) |
| Ethoxylated (4) bisphenol A diacrylate | SR601 | Sartomer (Exton, PA) |
| Trimethylolpropane triacrylate | TMPTA | Cytec Industries (Woodland Park, NJ) |
| Phenoxyethyl Acrylate | PEA (Etermer 2010) | Eternal Chemical Co., Ltd., Kaohsiung, Taiwan |
| 2-Hydroxy-2-methylpropiophenone photoinitiator | Darocur 1173 | BASF Corporation (Florham Park, New Jersey) |
| Diphenyl(2,4,6-trimethylbenzoyl)phosphine oxide photoinitiator | TPO | BASF Corporation (Florham Park, New Jersey) |
| Irgacure 1035 anti-oxidant | I1035 | BASF Corporation (Florham Park, New Jersey) |

TABLE 2

Raw materials for the layer-by-layer (LBL) coatings

| Material | Abbreviation | Source |
| --- | --- | --- |
| Poly(diallyl-dimethyl ammonium chloride), molecular weight 100-200K | PDAC | Sigma-Aldrich Co. (St. Louis, Missouri) |
| CAB-O-JET 352K carbon black nano-pigment, 70-80 nm diameter, carboxylate functionalized | COJ352K | Cabot Corporation (Boston, Massachusetts) |
| DVSZN004 silica nanoparticles, 45 nm diameter, ammonium stabilized | $SiO_2$ | Nalco Company (Naperville, Illinois) |
| Sodium chloride | NaCl | Sigma-Aldrich Co. (St. Louis, Missouri) |

TABLE 3

Raw materials for reactive ion etching

| Material | Abbreviation | Source |
| --- | --- | --- |
| Oxygen (UHP compressed gas) | $O_2$ | Oxygen Service Company (St Paul, Minnesota) |
| PFG-3218 (Octafluoropropane) | $C_3F_8$ | 3M Company (St Paul, Minnesota) |

Preparative Example 1 (PE1): Preparation of "Square Wave" Microstructured Film

A diamond (29.0 μm tip width, 3° included angle, 87 μm deep) was used to cut a tool having a plurality of parallel linear grooves. The grooves were spaced apart by a pitch of 62.6 microns. Resin A was prepared by mixing the materials in Table 4 below.

TABLE 4

Composition of Resin A used to make microstructured film

| Material | Parts by Weight |
| --- | --- |
| Photomer 6010 | 60 |
| SR602 | 20 |
| SR601 | 4.0 |
| TMPTA | 8.0 |
| PEA (Etermer 2010) | 8.0 |
| Darocur 1173 | 0.35 |
| TPO | 0.10 |
| I1035 | 0.20 |

A common industry "cast-and-cure" microreplication process was carried out with Resin A and a tool as described in U.S. Pat. No. 8,096,667. The microreplication conditions for these samples were set as follows: resin temperature 150° F., die temperature 150° F., coater IR 120° F. edges/130° F. center, tool temperature 100° F., and line speed 70 fpm, Fusion D lamps (available from Fusion UV Systems, Gaithersburg, MD.), with peak wavelength at 385 nm, were used for curing and operated at 100% power. The resulting microstructured film comprised a plurality of protrusions (e.g. light transmissive regions) separated by channels as illustrated in FIG. 1.

The process yields a microstructured film that forms a topographical inverse of the tool microstructure such that the protrusions of the microstructured film are a negative replication of the grooves of the tool. The protrusions have a wall angle of 1.5 degrees resulting in the protrusions being slightly tapered (wider at the light input surface and narrower at the light output surface). The channels of the microstructured film are a negative replication of the uncut portions of the tool between the grooves.

Preparation method for Layer-by-Layer (LbL) Self-Assembled Coatings on Microstructured Film Layer-by-layer self-assembled coatings were made using an apparatus purchased from Svaya Nanotechnologies, Inc. (Sunnyvale, CA) and modeled after the system described in U.S. Pat. No. 8,234,998 (Krogman et al.) as well as Krogman et al. Automated Process for Improved Uniformity and Versatility of Layer-by-Layer Deposition, Langmuir 2007, 23, 3137-3141. The apparatus comprises pressure vessels loaded with the coating solutions. Spray nozzles with a flat spray pattern (from Spraying Systems, Inc., Wheaton, Illinois) were mounted to spray the coating solutions and rinse water at specified times, controlled by solenoid valves. The pressure vessels (Alloy Products Corp., Waukesha, WI) containing the coating solutions were pressurized with nitrogen to 30 psi, while the pressure vessel containing deionized (DI) water was pressurized with air to 30 psi. Flow rates from the coating solution nozzles were each 10 gallons per hour, while flow rate from the DI water rinse nozzles were 40 gallons per hour. The substrate to be coated was adhered around the edge with epoxy (Scotch-Weld epoxy adhesive, DP100 Clear, 3M Company, St. Paul, MN) to a glass plate (12"×12"×⅛" thick) (Brin Northwestern Glass Co., Minneapolis, MN), which was mounted on a vertical translation stage and held in place with a vacuum chuck. In a typical coating sequence, the polycation (e.g., PDAC) solution was sprayed onto the substrate while the stage moved vertically downward at 76 mm/sec. Next, after a dwell time of 12 sec, the DI water was sprayed onto the substrate while the stage moved vertically upward at 102 mm/sec. The substrate was then dried with an airknife at a speed of 3 mm/sec. Next, the polyanion (e.g., pigment nanoparticles) solution was sprayed onto the substrate while the stage moved vertically downward at 76 mm/sec. Another dwell period of 12 sec was allowed to elapse. The DI water was sprayed onto the substrate while the stage moved vertically upward at 102 mm/sec. Finally, the substrate was then dried with an airknife at a speed of 3 mm/sec. The above sequence was repeated to deposit a number of "bi-layers" denoted as (Polycation/Polyanion). where n is the number of bi-layers.

Preparation Method for Reactive Ion Etching Microstructured Film

Reactive ion etching (RIE) was performed in a parallel plate capacitively coupled plasma reactor functionally equivalent to system described in U.S. Pat. No. 8,460,568. The chamber has a central cylindrical powered electrode with a surface area of 18.3 ft$^2$. After placing the microstructured film on the powered electrode, the reactor chamber was pumped down to a base pressure of less than 1.3 Pa (2 mTorr). A mixture of $C_3F_8$ (octafluoropropane) and $O_2$ (oxygen) gas was flowed into the chamber at specified flow rates. Treatment was carried out using a reactive ion etching method by coupling RF power into the reactor at a frequency of 13.56 MHz and an applied power of 9000 watts. Treatment time was controlled by moving the microstructured film through the reaction zone at a controlled rate. Following the treatment, the RF power and the gas supply were stopped and the chamber was returned to atmospheric pressure. Additional information regarding materials, processes for applying cylindrical RIE, and further details around the reactor used can be found in U.S. Pat. No. 8,460,568 B2.

Preparation Method for Back-Filling Channels of the Microstructured Film

The channels were back-filled with Resin A used in PE1 by pipetting the resin between the microstructured film surface and a piece of unprimed, 2 mil-thick PET film placed on top, using a hand roller to apply pressure to the top PET film, and then UV curing with a Heraeus (Hanau, Germany) belt conveyer UV processor (Model #DRS(6)) with an 'H' bulb at 500 Watt power. Specifically, the samples were sent through the UV curing station three times at a conveyer speed of 50 ft/min. Next, the top PET film was stripped off the microstructured film by hand.

Test Method: Luminance Profile from a Diffuse Light Source

A sample of film was placed on a Lambertian light source. When the light absorptive regions are tapered, the film is positioned such that the widest portion of the absorptive regions are closer to the light source. An Eldim L80 conoscope (Eldim S. A., HEROUVILLE SAINT CLAIR, France) was used to detect light output in a hemispheric fashion at all polar and azimuthal angles simultaneously. After detection, a cross section of transmission (e.g. brightness) readings were taken in a direction orthogonal to the direction of the louvers (denoted as a 0° orientation angle), unless indicated otherwise. Relative transmission is defined as the brightness ratio at a certain viewing angle, between a reading with film and a reading without the film.

The Lambertian light source consisted of diffuse transmission from a light box having the baseline luminance profile depicted in FIG. 6. The light box was a six-sided hollow cube measuring approximately 12.5 cm×12.5 cm×11.5 cm (L×W×H) made from diffuse polytetrafluoroethylene (PTFE) plates of ~6 mm thickness. One face of the box was chosen as the sample surface. The hollow light box had a diffuse reflectance of ~0.83 measured at the sample surface (e.g. ~83%, averaged over the 400-700 nm wavelength range). During testing, the box was illuminated from within through a ~1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCR-II with a 1 cm diameter fiber bundle extension from Schott-Fostec LLC, Marlborough Mass. and Auburn, N.Y.).

Test Method: Luminance Profile from a Collimated Light Source

A sample of film was placed on a collimated light source. When the light absorptive regions are tapered, the film is positioned such that the widest portion of the absorptive regions are closer to the light source. An Eldim L80 conoscope (Eldim S. A., HEROUVILLE SAINT CLAIR, France) was used to detect light output in a hemispheric fashion at all polar and azimuthal angles simultaneously. After detection, a cross section of brightness (e.g. brightness in cd/m2) readings were taken in a direction orthogonal to the direction of the louvers (denoted as a 0° orientation angle), unless indicated otherwise. For a single sample, measurements will be made with the louver film in the light path, with light source angles from 0 to 50 degrees. The cross sections from each of these measurements are then normalized by dividing measured values by the peak measured brightness of the 0 degree input from the first measurement.

The collimated light source consisted of a white LED (blue LED with phosphor) and a collimating optic (lens) place at a distance so that the LED is at the focal point of the lens. The full width at half max (FWHM) is less than 2 degrees. The light source with lens is mounted on a swing arm allowing rotation of angle of incidence from 0 to 80 degrees with 1 degree resolution. The louver film under test is placed on a platform above the light source with an aperture at the point around which the collimated light source pivots.

Test Method: Optical Extinction Coefficient

The optical extinction coefficient, k of a thin film coating is commonly determined by either ellipsometry or UV/VIS spectroscopy. The extinction coefficient, k, is defined as $\alpha\lambda/(4\pi)$ where a is the absorption coefficient and, is wavelength. For a thin film coating on a transparent substrate, one can use UV/VIS spectroscopy to measure the absorptance (A) as 1−T−R, where T is transmittance and R is reflectance. The measured A must be appropriately corrected for the A of the substrate to obtain A of the thin film itself. A is then converted to a by the equation $\sigma=-\ln[(100-A)/100]/h$ where h is the thickness of the thin film coating; this equation for a is an approximation used when R is relatively small and A is relatively large. Thickness can be measured, for example, by stylus profilometry or cross-sectional scanning electron microscopy.

Preparative Example 2 (PE2): Preparation of Coating Solutions

PDAC coating solution was made by diluting PDAC from 20 wt % to a concentration of wt % with deionized (DI) water. COJ352K coating solution was made by diluting COJ352K from 15 wt % to a concentration of 1.0 wt % with DI water. SiO$_2$:COJ352K (3.4:1) coating solution was made by adding SiO$_2$ (from 40 wt %) along with COJ352K (from 15 wt %) to DI water to concentrations of 1.0 wt % SiO$_2$ and 0.29 wt % COJ352K. SiO$_2$:COJ352K (4:1) coating solution was made by adding SiO$_2$ (from 40 wt %) along with COJ352K (from 15 wt %) to DI water to concentrations of 1.0 wt % SiO$_2$ and 0.25 wt % COJ352K. SiO$_2$:COJ352K (5:1) coating solution was made by adding SiO$_2$ (from 40 wt %) along with COJ352K (from 15 wt %) to DI water to concentrations of 1.0 wt % SiO$_2$ and 0.20 wt % COJ352K. SiO$_2$:COJ352K (12.4:1) coating solution was made by adding SiO$_2$ (from 40 wt %) along with COJ352K (from 15 wt %) to DI water to concentrations of 1.0 wt % SiO$_2$ and 0.08 wt % COJ352K. SiO$_2$:COJ352K (20:1) coating solution was made by adding SiO$_2$ (from 40 wt %) along with COJ352K (from 15 wt %) to DI water to concentrations of 1.0 wt % SiO$_2$ and 0.05 wt % COJ352K. NaCl was added to all coating solutions to a concentration of 0.05 M.

EXAMPLE DESCRIPTION

Comparative Example 1 (CE-1): Louver Film (Non-Cladded Louvers)

A sheet of microstructured film as made in PE1 was cut to a size of 9"×10" and corona treated by hand using a BD-20AC Laboratory Corona Treater (Electro-Technic Products, Chicago, IL) to prevent the aqueous coating solutions from beading up and dewetting. PDAC and CAB-O-JET 352K coating solutions were made as described in PE2. The corona-treated film was coated with (PDAC/COJ352K)$_{20}$ (i.e., 20 bi-layers) using the preparation method for LbL self-assembled coatings described previously. An equivalent coating deposited onto a glass plate had a thickness of 273 nm as measured by a Dektak XT stylus profilometer after scoring the coating with a razor blade. The coated film was then subjected to reactive ion etching (RIE) with O$_2$ and C$_3$F$_8$ gases flowing at 125 SCCM and 375 SCCM, respectively, with an applied power of 9000 W for a duration of 450 s. Next, the channels were back-filled using the preparation method for back-filling channels described previously. The luminance profile from a diffuse light source was measured and data are displayed in Table 5. The luminance profile from a collimated light source was also measured for a collimated light source at 0, 10, 20, 25, 30, 35, and 40 degree incident angles; data are displayed in Tables 6-9.

For reference and for measurement of the extinction coefficient, k, a plate of 12"×12"×⅛" float glass was coated with (PDAC/COJ352K)$_{20}$ using the "Preparation Method for Layer-by-Layer Self-Assembled Coatings on Microstructured Film" except using only the glass plate as the substrate. The coating had an extinction coefficient (k) at 550 nm of 0.31, as determined using the UV-VIS based optical extinction coefficient test method described previously.

Example 1: Louver Film (Low k Cladded Louvers—Trilayer Structure)

A sheet of microstructured film as made in PE1 was cut to a size of 9"×10" and corona treated by hand using a BD-20AC Laboratory Corona Treater (Electro-Technic Products, Chicago, IL) to prevent the aqueous coating solutions from beading up and dewetting. PDAC, COJ352K, and SiO$_2$:COJ352K (4:1) coating solutions were made as described in PE2. The corona-treated film was coated with (PDAC/(SiO$_2$:COJ352K (4:1)))$_7$(PDAC/COJ352K)$_{11}$ (PDAC/(SiO$_2$:COJ352K (4:1)))$_7$ using the preparation method for making LbL self-assembled coatings. The total number of bi-layers deposited was 25. The core layer has 11 bi-layers, and the cladding layers each have 7 bi-layers. An equivalent coating deposited onto a glass plate had a thickness of 413 nm as measured by a Dektak XT stylus profilometer after scoring the coating with a razor blade. The coated film was then subjected to reactive ion etching (RIE) with O$_2$ and C$_3$F$_8$ gases flowing at 125 SCCM and 375 SCCM, respectively, with an applied power of 9000 W for a duration of 500 s. This step was followed by a second process of reactive ion etching (RIE) with O$_2$ and C$_3$F$_8$ gases flowing at 375 SCCM and 125 SCCM, respectively, with an applied power of 9000 W for a duration of 50 s. Next, the channels were back-filled using the method described previously. The luminance profile from a diffuse light source was measured and data are included in Table 5. The luminance profile from a collimated light source was also measured for a collimated light source at 0, 10, 20, 25, 30, 35, and 40 degree incident angles; data are displayed in Tables 6-9.

For reference and for measurement of the extinction coefficient, k, a plate of 12"×12"×⅛" float glass was coated with (PDAC/SiO2:COJ352K (5:1))$_{20}$ using the "Preparation Method for Layer-by-Layer Self-Assembled Coatings on Microstructured Film" except using only the glass plate as the substrate. The coating had a thickness of 388 nm as measured by a Dektak XT stylus profilometer after scoring the coating with a razor blade. The coating had a refractive index (n) and extinction coefficient (k) at 550 nm of 1.47 and 0.155, respectively, as determined with a J. A. Woollam (Lincoln, Nebraska) RC2 spectroscopic ellipsometer. Ellipsometry data were acquired at incident angles of 55, 65, and 75 degrees at wavelengths from 300-1000 nm; the glass plate substrate was modeled as a Cauchy layer and the light absorbing coating was modeled as a Kramers-Kronig consistent B-spline layer with a surface roughness layer.

Example 2: Louver Film (Low k Cladded Louvers—Pentalayer Structure)

A sheet of microstructured film as made in PE1 was cut to a size of 9"×10" and corona treated by hand using a BD-20AC Laboratory Corona Treater (Electro-Technic Products, Chicago, IL) to prevent the aqueous coating solutions from beading up and dewetting. PDAC, COJ352K, SiO$_2$:COJ352K (3.4:1), and SiO$_2$:COJ352K (12.4:1) coating solutions were made as described in PE2. The corona-treated film was coated with (PDAC/(SiO$_2$:COJ352K (12.4:1)))$_4$ (PDAC/(SiO$_2$:COJ352K (3.4:1)))$_4$(PDAC/COJ352K)$_7$ (PDAC/(SiO$_2$:COJ352K (3.4:1)))$_4$(PDAC/(SiO$_2$:COJ352K (12.4:1)))$_4$ using the preparation methods for LbL self-assembled coating described previously. The total number of bi-layers deposited was 23. The core layer has 7 bi-layers, the innermost cladding layers (closest to the core) each have 4 bi-layers, and the outermost cladding layers each have 4 bi-layers. An equivalent coating deposited onto a glass plate had a thickness of 422 nm as measured by a Dektak XT stylus profilometer after scoring the coating with a razor blade. The coated film was then subjected to reactive ion etching (RIE) with O$_2$ and C$_3$F$_8$ gases flowing at 125 SCCM and 375 SCCM, respectively, with an applied power of 9000 W for a duration of 250 s. This step was followed by a second process of reactive ion etching (RIE) with O$_2$ and C$_3$F$_8$ gases flowing at 375 SCCM and 125 SCCM, respectively, with an applied power of 9000 W for a duration of 100 s. Next, the channels were back-filled using the previously described method. The luminance profile from a diffuse light source was measured and data are included in Table 5.

For reference and for measurement of the extinction coefficient, k, a plate of 12"×12"×⅛" float glass was coated with (PDAC/SiO$_2$:COJ352K (20:1))$_{20}$ using the "Preparation Method for Layer-by-Layer Self-Assembled Coatings on Microstructured Film" except using only the glass plate as the substrate. The coating had a thickness of 462 nm as measured by a Dektak XT stylus profilometer after scoring the coating with a razor blade. The coating had a refractive index (n) and extinction coefficient (k) at 550 nm of 1.36 and 0.072, respectively, as determined with a J. A. Woollam (Lincoln, Nebraska) RC2 spectroscopic ellipsometer. Ellipsometry data were acquired at incident angles of 55, 65, and 75 degrees at wavelengths from 300-1000 nm; the glass plate substrate was modeled as a Cauchy layer and the light absorbing coating was modeled as a Kramers-Kronig consistent B-spline layer with a surface roughness layer.

Test Results

TABLE 5

Transmission (%) for different viewing angles.

Relative Transmission at viewing angle (degrees)

| Ex. | 0° | +30° | −30° | Avg. of +30° and −30° | +35 to +80° | −35 to −80° | Avg. of (+35 to +80°) and (−35 to −80°) |
|---|---|---|---|---|---|---|---|
| EX1 | 92.3 | 16.1 | 14.1 | 15.1 | 3.0 | 2.9 | 3.0 |
| EX2 | 84.0 | 18.9 | 15.9 | 17.4 | 4.1 | 3.7 | 3.9 |
| CE1 | 93.3 | 21.9 | 22.4 | 22.1 | 5.4 | 5.6 | 5.5 |

TABLE 6

Maximum peak % T normalized to 0° peak

Measurement angle:

| Sample | 10° | 20° | 25° | 30° | 35° | 40° |
|---|---|---|---|---|---|---|
| EX1 | 65.4% | 20.1% | 9.4% | 2.9% | 2.8% | 2.0% |
| CE1 | 49.5% | 14.9% | 4.8% | 6.2% | 3.9% | 3.3% |

TABLE 7

Maximum peak % R normalized to 0° peak

Measurement angle:

| Sample | 10° | 20° | 25° | 30° | 35° | 40° |
|---|---|---|---|---|---|---|
| EX1 | 4.9% | 6.1% | 6.2% | 5.0% | 3.3% | 2.2% |
| CE1 | 6.3% | 8.3% | 7.6% | 7.6% | 4.8% | 2.7% |

TABLE 8

Integral under the % T curve where the units are % T multiplied by degree range

Measurement angle:

| Sample | 10° | 20° | 25° | 30° | 35° | 40° |
|---|---|---|---|---|---|---|
| EX1 | 1.5 | 0.77 | 0.52 | 0.15 | 0.07 | 0.05 |
| CE1 | 1.2 | 0.69 | 0.31 | 0.14 | 0.10 | 0.09 |

TABLE 9

| | Integral under the % T curve where the units are % R multiplied by degree range | | | | | |
|---|---|---|---|---|---|---|
| | Measurement angle: | | | | | |
| Sample | 10° | 20° | 25° | 30° | 35° | 40° |
| EX1 | 0.31 | 0.37 | 0.35 | 0.28 | 0.18 | 0.12 |
| CE1 | 0.41 | 0.47 | 0.46 | 0.38 | 0.27 | 0.18 |

Measured results reported in tables 6-9 were gathered from conoscopic measurements as described in Luminance Profile from a Collimated Light Source test method. We observe from results in tables 7 and 9 that both the maximum peak % R and the integrated value under the % R curve are lower for Example 1 than Comparative Example 1.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A light control film comprising:
   a light input surface and a light output surface opposite the light input surface;
   alternating transmissive regions and absorptive regions disposed between the light input surface and the light output surface, wherein the absorptive regions comprise a core having a first extinction coefficient, $k_1$, sandwiched between cladding layers having a second extinction coefficient, $k_2$, wherein $k_2 < k_1$, and wherein the cores have an aspect ratio of at least 20,
   wherein the core comprises 30 wt. % to 100 wt. % of a light absorbing material and the cladding layers comprise 0.5 wt. % to 50 wt. % of the light absorbing material.

2. The light control film of claim 1 wherein the core and the cladding layers comprise light absorbing material comprising light absorbing particles.

3. The light control film of claim 1 wherein the core and the cladding layers comprise organic light absorbing material.

4. The light control film of claim 1 wherein the core and the cladding layers comprise carbon black particles.

5. The light control film of claim 1 wherein the core and the cladding layers comprise light absorbing particles having a median particle size less than about 500 nanometers.

6. The light control film of claim 1 wherein $k_1$ is 0.2-0.4 and $k_2$ is 0.005-0.15.

7. The light control film of claim 1 wherein the cladding layers comprise light absorbing particles, non-light absorbing diluent and an organic polymeric material.

8. The light control film of claim 7 wherein the non-light absorbing diluent comprises silica particles.

9. The light control film of claim 1 wherein the transmissive regions have a wall angle less than 5 degrees.

10. The light control film of claim 1 wherein the transmissive regions and absorptive regions have a height ranging from 40 microns to 400 microns.

11. The light control film of claim 1 wherein the cores have an average width no greater than 5 microns.

12. The light control film of claim 1 wherein the cladding layers have an average width no greater than 1 micron.

13. The light control film of claim 12 wherein the cladding layers have an average width of 100 nm to 500 nm.

14. The light control film of claim 1 wherein the absorptive regions have an aspect ratio of at least 50.

15. The light control film of claim 1 wherein the transmissive regions have an aspect ratio of a least 2.

16. The light control film of claim 1 wherein absorptive regions have an average pitch of 10 microns to 400 microns.

17. The light control film of claim 1 wherein the light control film has a relative transmission at a viewing angle of 0 degrees of at least 75%.

18. The light control film of claim 1 wherein the light control film has an average relative transmission at viewing angles of 35 degrees to 80 degrees of no more than 5%.

19. The light control film of claim 1 wherein the cladding layers are conformal coatings on the cores.

20. A light control film comprising:
    a light input surface and a light output surface opposite the light input surface;
    alternating transmissive regions and absorptive regions disposed between the light input surface and the light output surface, wherein the absorptive regions comprise a core comprising light absorbing particles sandwiched between cladding layers comprising light absorbing particles and non-light absorbing diluent, and wherein the cores have an aspect ratio of at least 20,
    wherein the core comprises 30 wt. % to 100 wt. % of a light absorbing material and the cladding layers comprise 0.5 wt. % to 50 wt. % of the light absorbing material.

* * * * *

UNITED STATES PATENT AND TRADEMARK OFFICE
CERTIFICATE OF CORRECTION

| | | |
|---|---|---|
| PATENT NO. | : 11,940,689 B2 | Page 1 of 1 |
| APPLICATION NO. | : 18/064644 | |
| DATED | : March 26, 2024 | |
| INVENTOR(S) | : Daniel J Schmidt et al. | |

It is certified that error appears in the above-identified patent and that said Letters Patent is hereby corrected as shown below:

In the Claims

Column 26
Line 25, In Claim 15, delete "a least" and insert -- at least --, therefor.

Signed and Sealed this
Sixth Day of August, 2024

Katherine Kelly Vidal
Director of the United States Patent and Trademark Office